United States Patent [19]
Delassus

[11] Patent Number: 4,761,579
[45] Date of Patent: Aug. 2, 1988

[54] ELECTROMAGNETIC LEVITATION DEVICE

[75] Inventor: Jean Delassus, Montmorency, France

[73] Assignee: Alsthom, Paris Cedex, France

[21] Appl. No.: 49,174

[22] Filed: May 13, 1987

[30] Foreign Application Priority Data

May 14, 1986 [FR] France ................. 86 06933

[51] Int. Cl.⁴ ............................................. F16C 39/06
[52] U.S. Cl. ................................ 310/90.5; 219/10.67; 361/143
[58] Field of Search ............. 310/90.5; 219/7.5, 10.41, 219/10.67; 72/56; 361/143, 146

[56] References Cited

U.S. PATENT DOCUMENTS 3,512,852  5/1970  North .................................. 310/90.5
3,927,735 12/1975  Miericke ............................. 310/90.5
4,331,896  5/1982  Sedgewick .
4,585,282  4/1986  Bosley ................................ 310/90.5

FOREIGN PATENT DOCUMENTS 2412221  9/1975  Fed. Rep. of Germany .
1426389 12/1966  France .
2521797  2/1982  France .

Primary Examiner—R. Skudy
Attorney, Agent, or Firm—Sughrue, Mion, Zinn, Macpeak and Seas

[57] ABSTRACT

A two-dimensional network of alternating (N,S) magnetic poles is generated by a heavy gauge conductor (F) having an alternating current from an excitation source (G) passing therethrough. The conductor follows zigzag go and return paths (T1,T6) without any crossing, juxtaposition, or superposition, thereby simplifying construction. The invention is applicable to handling metal sheets in steel mills.

6 Claims, 2 Drawing Sheets

ELECTROMAGNETIC LEVITATION DEVICE

Electromagnetic levitation is known per se (see, for example, French Pat. No. 82 02679 filed Feb. 18, 1982 published under the No. 2 521 797). It is used in laboratories and in industry, e.g. for supporting rotors (magnetic bearings), and in metallurgy for handling metal blocks (in heat treatment ovens) or for handling liquid metals.

BACKGROUND OF THE INVENTION

In order to obtain such support, it is necessary, in theory, to cause an alternating magnetic field to pass through a part which, in order to obtain the best possible results, should be as nonmagnetic as possible and as good a conductor of electricity as possible. This part is often in the form of a horizontal plate, or sheet or the like. At the part, said field has two perpendicular components:

one of which is vertical (parallel to gravity and perpendicular to the part) and may be called the "through" component of the field; and the other of which is horizontal and may be called "tangential" component since it runs parallel to the part.

The flux of the vertical or through component induces electrical currents in the part. By application of Fleming's rule, these induced currents co-operate with the tangential component of the field to create vertical forces. If the geometry of the system is suitable, this force opposes gravity and "levitates" the part. FIG. 1 is an elevation view of a prior art device applying this principle to a relatively thin metal sheet. The figure shows:

the sheet 1 to be levitated which extends horizontally between two networks of magnetic field generator devices ("poles");

a bottom network 2 of poles which alternate between north polarity (marked N) and south polarity (marked S); and a top network 3 disposed symmetrically to the preceding network with same-polarity poles facing one another and with the resulting magnetic field being represented by arrows H.

In theory, it is not essential to use two networks of poles, nor is it essential (when two networks are used) for facing poles to be of the same polarity, but this is the disposition which provides best device efficiency. If facing poles are of opposite polarity, then there is too much through flux and this gives to rise to undesirable heating due to the Joule effect in the levitated part.

FIG. 2 shows one element (or "mesh") forming part of a plate to be levitated between two facing poles, and correpsonding to said pair of poles. This element is in the form of a quadrilateral Q. It may, for example, be square and form a part of a regular two dimensional network extending over the entire area of the sheet and resulting from the corresponding regular disposition of the north and south poles. The through component of the field Hv induces a current i at a point P where the tangential component of the field is Hh. Said component and said current create a vertical levitation force FS in accordance with Fleming's rule which is applied at point P. If the sheet is equidistant between the two identical networks of poles, the through component Hv is zero (by symmetry) and so the force FS is also zero. The sheet therefore moves towards the bottom network until the levitation forces are such that FS becomes large enough to support the sheet.

In currently produced devices, the poles are formed by windings having an excitation current flowing therethrough and optionally being wound around a laminated magnetic circuit: the term "winding" is used herein to designate the well-known device constituted by a relatively fine electrical conductor wound in a greater or lesser number of coaxial loops or "turns".

The poles are disposed in a manner which matches the shape of the parts to be levitated. In order to levitate a plane horizontal sheet, the poles are distributed above and below the sheet as shown in FIG. 3. The windings of the bottom network 2 are referenced NB and SB and the windings of the top network 3 are referenced NH and SH.

Connecting wires must be placed between the windings: the windings NB and SB in a given row are, for example, connected in series by wires such as 5 and 7 belonging to said row and themselves connected to wires such as 9 and 11 which are common to all of the rows of a given network.

These devices using windings suffer, in practice, from drawbacks due to the volume they occupy in the plane in which they are laid, and from their fragility in the face of the attacks to which they are exposed from various different sources:

In particular there are the following drawbacks:

(1) the levitation area above and below the sheet is largely occupied by windings and their connection wires, thereby limiting or preventing useful devices from occupying said area (e.g. heating or cooling devices, devices for performing inspection or measurement . . . ). This is referred to by saying that the device is not sufficiently transparent; and (2) the windings and the connection wires are necessarily made from wires which are insulated using an insulating varnish or enamel, since these wires touch one another and cross at numerous points. They therefore constitute relatively complex and fragile assemblies, in particular in the presence of hot sheets.

The present invention seeks to provide magnetic levitation while eliminating these drawbacks by providing a device which is both transparent and robust. Beginning with the general, the subject matter of the present invention may be defined by the following points:

SUMMARY OF THE INVENTION

An electromagnetic levitation device supports an electrically conductive part (1) above a levitation area (AU) without making contact therewith, i.e. for maintaining a distance between said part and said area against the action of a force such as the force of gravity tending to urge said part towards said area. The device comprises:

a source (G) of an alternating excitation electric current, at least one elongate excitation electric conductor (F) fed from said source and extending over said levitation area, at least beneath said part to be levitated in order to form in said area a two-dimensional network of magnetic poles (N,S), whose magnetic field lines extend away from said area, said network having a configuration analogous to that of a checkerboard with "squares" in the form of juxtaposed quadrilaterals Q, with two squares that are adjacent by a common side being occupied by poles of opposite polarity, one of said poles being a north pole (N) and the other being a south pole (S), and vice versa, so as to simultaneously create in said part (1) to be levitated both through magnetic field components inducing currents running parallel to said area, and also tangential magnetic field components in parallel to said area and intersecting said currents to generate levitation forces (FS) perpendicular to said area.

The device is characterized by the fact that said excitation conductor (F) follows, in said levitation area, a succession of sawtooth paths (T1, T2, . . . , T6) which follow one another in a first direction (D1) and each of which has an average axis (A1) running along a second direction (D2) inclined relative to the first direction in such a manner as to cover at least a substantial portion of said levitation area, each of said sawtooth paths (T1) extending away from its axis alternately in one direction and then in the other, with any two consecutive ones of said sawtooth paths (T1, T2) constituting a preceding path (T1) and a succeeding path (T2) and being disposed so that the points on the preceding path which are closest to the axis (A2) of the succeeding path are opposite to the points of the succeeding path which are closest to the axis (A1) of the preceding path, but without said two paths crossing each other, with two of such points thus forming a zone of maximum proximity (P, J1, J2, etc.) between said two paths, said proximity zones between two paths being aligned along said second direction, and said two paths then at least approximately tracing out therebetween a row of said quadrilaterals running along said second direction, with each quadrilateral being situated between two consecutive proximity zones, the succession of said sawtooth paths forming a succession of such rows of quadrilaterals and simultaneously forming at least one portion of said two-dimensional network, quadrilaterals which are adjacent via a common side being aligned along third and fourth directions (D3, D4) sloping at opposite angles relative to either of said first and second directions.

The excitation electric current runs along said succeeding path (T2) in the opposite direction to the current running along said preceding path (T1), in such a manner as to form a row of magnetic poles of the same polarity (S) in the row of quadrilaterals traced between said two paths (T1, T2), and to form a similar row of magnetic poles of opposite polarity (N) in the next row of quadrilaterals (T2, T3), and so on in alternation, thereby simultaneously ensuring that said poles are always of said opposite polarities between any two squares which are adjacent by a common side, and that said network of poles is finally constituted by a reduced length of conductor and by a reduced number of encounters between conductors.

The device may be further characterized by the fact that said preceding path (T1) joins said succeeding path (T2) in a junction zone (J1) which is one of said proximity zones located at a common end of said two paths, said succeeding path itself joining the next succeeding path (T3) in a succeeding junction zone (J2) which is a proximity zone at the other end of said path, and so on, so as to form a series electrical connection between the successive paths.

The device may also have a first one of said paths (T1) fed with electricity from an inlet end (EE) of said path at one side of said succession paths, and may be characterized by the fact that the number of said paths is even so that a last path (T6) terminates at the same side of said succession, with an additional path (TS) running from the outlet end of said last path towards said inlet end (EE) of the first path and likewise having a sawtooth configuration on either side of an average axis (AS) which extends along said first direction (D1), said additional path coming close to each of said even numbered junction zones (J2) but without making electrical contact therewith, and moving away in between said zones, and terminating at an outlet end (ES) next to said inlet end (EE) so as to trace out a column of additional quadrilaterals in said two-dimensional network and to form additional magnetic poles in said levitation area, while using a minimal length of conductor and without having any crossings.

The device may be additionally characterized by the fact that said quadrilaterals are square having their sides oriented along said third and fourth directions (D3, D4) which are at 45° to said first and second directions (D1, D2) said paths (T1, . . . , T6) succeeding one another at a pitch equal to the pitch of the sawteeth along each of said paths, thereby constituting a rectangular levitation device on said area with substantially constant levitation force along the edges thereof.

The device may be applied to levitating a metal sheet (1) running along a transfer direction, and may be additionally characterized by the fact that said transfer direction (D2) constitutes one of said first and second directions (D1, D2).

The device also may be additionally characterized by the fact that it includes two of said two-dimensional networks on either side of a gap through which the part to be levitated passes, the magnetic pole of each polarity formed by either one of these networks being located opposite to magnetic poles of the same polarity formed by the other one of said networks.

The excitation conductor used in the present invention is of relatively large cross-section in order to convey a higher current than can be conveyed by the wires of prior art devices. This large cross-section is made possible by the absence of any juxtaposition, superposition, or crossing over. It contributes to the robustness of the device. This absence of superposition or crossing over simplifies problems of electrical insulation. The conductor may optionally be hollow and have a flow of cooling water running therealong.

BRIEF DESCRIPTION OF THE DRAWINGS

Implementations of the present invention within the scope defined above are described below in greater detail by way of non-limiting example and with reference to the accompanying diagrammatic figures. When the same item appears in more than one of the figures it is designated by the same reference symbol in each of them. Wherever such reference symbols are used above, it is in order to facilitate reference to said figures by way of non-limiting example. It must be understood that the items specified may be replaced by other items so long as they provide the same technical functions.

MORE DETAILED DESCRIPTION

Figure 4:
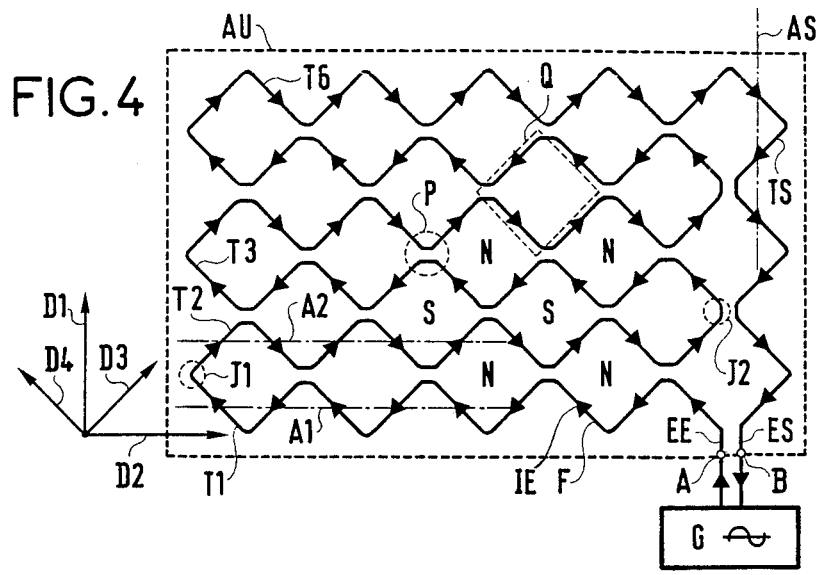
FIG. 4 is a plan view of a two-dimensional network of poles suitable for producing the device of FIG. 1 in accordance with the invention.

As mentioned above, a device in accordance with the invention is made in the form of a conductor conveying an excitation current and disposed in a zigzag configuration on a levitation area as shown in FIG. 4. This device corresponds to all of the points above.

Figure 1:
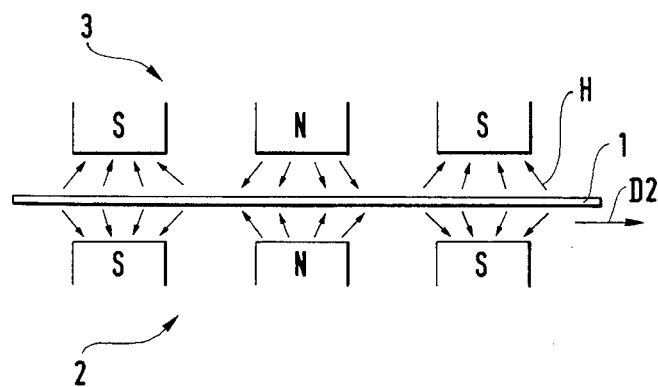
FIG. 1 is an elevation view of a prior art levitation device, as described above, and also of a first device in accordance with the invention.
Figure 2:
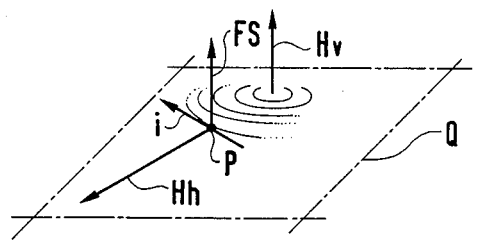
FIG. 2 is a perspective view for showing the directions of the components of the magnetic fields, of a current induced in the sheet to be levitated, and of the resulting levitation force, and is equally applicable to prior art devices and to devices in accordance with the invention.

As can be seen in this figure, an inlet terminal A and an outlet terminal B for alternating current excitation are placed at the front of the right-hand side edge of a rectangular levitation area AU, said edge extending parallel to the displacement direction D2 of the levitated plate 1 shown in FIG. 1.

The excitation conductor F curves along a zigzag line whose segments are inclined at 45° to the edges of the area. Six sawtooth paths T1 and T6 are shown following one another along the entire width of the levitation area, with alternating peaks and valleys. On reaching the other side edge (the left-hand edge) of the this area (at the end of path T6), the conductor is extended along a further zigzag path running along the front edge in order to cover the entire length of the area and to return to the outlet terminal B adjacent to A.

There is no contact between the successive paths of the conductor F in the proximity zones P situated at the corners of the quadrilaterals which are traced out approximately by the curved conductor.

Figure 3:
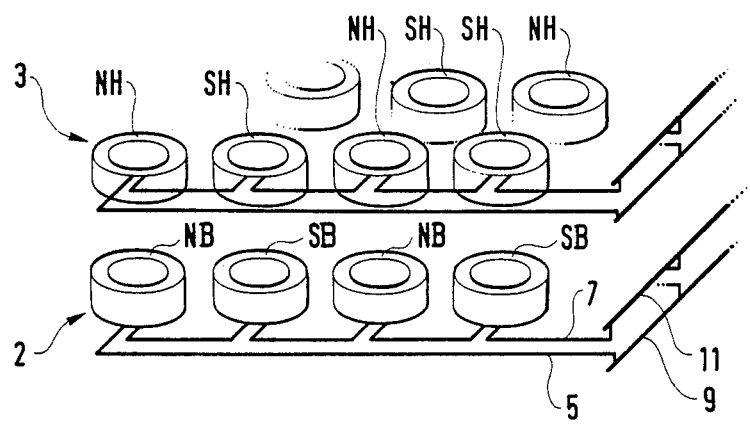
FIG. 3 is a perspective view of a prior art levitation device.

Each quadrilateral such as Q operates from the electromagnetic point of view as a single turn, as can be seen by observing arrows such as IE which show the direction of current flow along the conductor at a given instant. Each quadrilateral thus generates substantially the same magnetic field perpendicularly to the plane figure and at the frequency of the excitation current as would be generated by a winding centered on the same location. As a result, the device shown in FIG. 4 sets up the same network of magnetic poles as that shown in FIG. 3. The directions of the magnetic fields alternate in a staggered configuration as represented by the north and south poles N and S generated by a flow of current along arrows IE, with the poles always being opposite for any two adjacent quandrilaterals.

Figure 5:
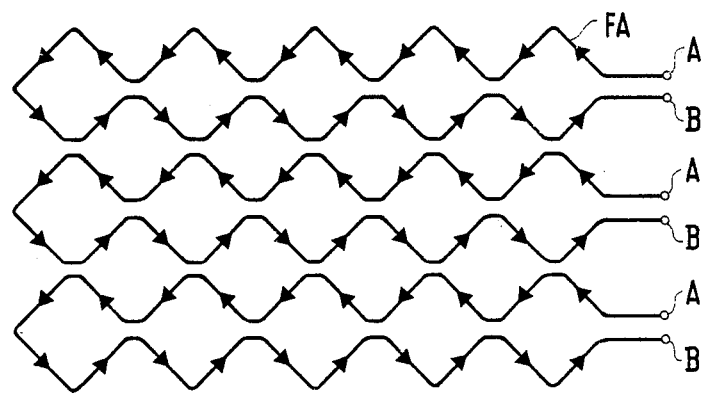
FIGS. 5 and 6 are plan views of two two-dimensional networks of poles belonging respectively to a second and to a third device in accordance with the invention.
Figure 6:
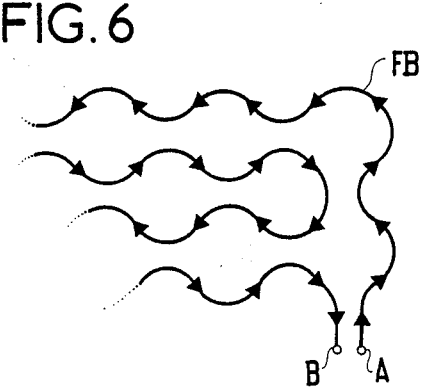
Figure 7:
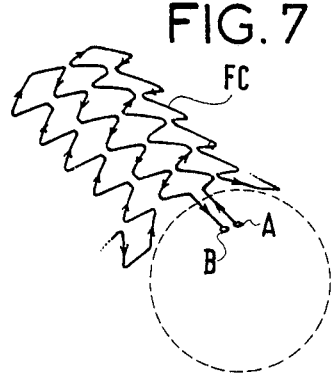
FIG. 7 is a perspective view of a two-dimensional network of poles for a fourth device in accordance with the invention.

Various other embodiments of the invention are possible. Some of these embodiments are shown in FIGS. 5, 6, and 7, in which the inlet and outlet terminals for the current continue to be referenced A and B respectively.

Although it is necessary, in accordance with the invention, for the conductor F to run at least approximately around the sides of the meshes in a network of quadrilaterals covering the levitation area and without adjacent strands of the conductor coming into contact (particularly at the corners of the "quadrilaterals"), there is no need for the mesh to be square. The mesh may be a rhombus-shaped mesh, preferably in order to constitute an integer number of lengths exactly covering the desired levitation area (although this is not essential). The mesh may be curvilinear such as that formed by conductor FB shown in FIG. 6. It is advantageous for the mesh to be regular in shape since this provides an additional advantage relative to the "winding" disposition shown in FIG. 3. The conductor may be solid, or hollow in order to have internal cooling, or multi-stranded, . . . The conductor may receive protective enamel, and may be fixed or supported, if necessary, by insulating devices placed, for example, in the proximity zones P. The terminals A and B may be placed at any desired location. Several pairs of terminals may be provided as shown in FIG. 5, where the conductor is reference FA.

In accordance with the invention, a non-plane part may be levitated by suitably curving the surface of a two-dimensional network of poles. In particular, a cylindrical object may be levitated by winding a network constituted by a conductor FC around the inside or the outside of a coaxial cylinder, shown in FIG. 7.

It is also possible to use a plurality of superposed networks either with or without magnetic cores.

An advantage of the present invention stems from the fact that prior art levitation devices using windings generally require protection against heat radiation from levitated parts and/or from the danger of a part falling onto the device if there is a power failure. This protection is provided by means of a screen which is disposed between the levitated part and the windings, and suffers from several drawbacks:

it greatly reduces any possibility of observing the suface of the levitated part;

in practice, it prevents the surface being treated by a blast of air or water; and the distance between the levitated part and the windings (i.e. the flux gap which should be as small as possible) must be wide enough to include the thickness of the screen and of its associated support structures.

In addition, it can be difficult to make such a screen. It must be transparent to magnetic flux and therefore it cannot be made of metal. It may be constituted, for example, by ceramic materials or by fibrous materials supported on a device which connects the screen to a supporting structure by passing through the windings.

These difficulties and drawbacks disappear with a device in accordance with the invention which is sufficiently robust to do without a screen. The flux gap is then reduced to a "mechanical safety margin", i.e. to the gap required to leave room for any irregularities or projections that there may be on the part being processed. By reducing the flux gap, the electrical consumption of the device is reduced.

I claim:

1. In an electromagnetic levitation device for supporting an electrically conductive part without physical contact, said device comprising:

a source of an alternating excitation electric current, and at least one elongate excitation electric conductor fed from said source and forming current loops and respective magnetic poles each of which alternates with said excitation electric current, said current loops defining a levitation area and forming a two-dimensional alternated network of said magnetic poles, the improvement wherein said at least one excitation conductor extends, in said levitation area in zigzag form, defining a succession of sawtooth paths which succeed one another in a first direction and each of which has a centerline running along a second direction, each of said conductor sawtooth paths forming on both sides thereof an alternate succession of conductor section peaks and of valleys each between two peaks, any two consecutive ones of said sawtooth paths having mutually facing peaks and valleys, without said two consecutive paths crossing each other, such that any pair of two of said mutually facing peaks form a proximity zone between said two paths, and means for feeding said two consecutive conductor sawtooth paths from said source in two opposite current directions, respectively, whereby said current loops are formed by respective pairs of two said mutually facing valleys between two said proximity zones.

2. A device according to claim 1, wherein a preceding path joins a succeeding path in a junction zone which is one of said proximity zones located at a common end of said two paths, said succeeding path itself joining the next succeeding path in a succeeding junction zone which is a proximity zone at the other end of said path, and so on, so as to form a series electrical connection between the successive paths.

3. A device according to claim 2, wherein a first one of said paths is fed with electricity from an inlet end of said path at one side of said succession paths, and wherein the number of said paths is even so that a last path terminates at the same side of said succession, with an additional path running from an outlet end of said last path towards said inlet end of the first path and likewise having a sawtooth configuration on either side of an average axis which extends along said first direction, said additional path coming close to each of said even numbered junction zones but without making electrical contact therewith, and moving away in between said zones, and terminating at an outlet end next to said inlet end so as to trace out a column of additional quadrilaterals in said two-dimensional network and to form additional magnetic poles in said levitation area, while using a minimal length of conductor and without having any conductor crossings.

4. A device according to claim 1, wherein said succession of sawtooth paths define juxtaposed quadrilaterals, and wherein said quadrilaterals are square having their sides oriented along third and fourth directions which are at 45° to said first and second directions, said paths succeeding one another at a pitch equal to the pitch of the sawteeth along each of said paths, thereby constituting a rectangular levitation device on said area with substantially constant levitation force along the edge thereof.

5. A device according to claim 4, applied to levitating a metal sheet running along a transfer direction, and wherein said transfer direction constitutes one of said first and second directions.

6. A device according to claim 1, further including a second two-dimensional network on the other side of a gap through which the part to be levitated passes, and wherein magnetic poles of each polarity are formed by either one of the networks located opposite to magnetic poles of the same polarity formed by the other one of the networks.

* * * * *